(12) United States Patent
Liu et al.

(10) Patent No.: US 12,033,179 B2
(45) Date of Patent: Jul. 9, 2024

(54) PERCEIVED VALUE ATTRIBUTION MODEL

(71) Applicant: Walmart Apollo, LLC, Bentonville, AR (US)

(72) Inventors: Changzheng Liu, Sunnyvale, CA (US); Wei Shen, Pleasanton, CA (US); Guangwei Yang, Seattle, WA (US); Qianqian Zhang, Castro Valley, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,487

(22) Filed: Jan. 31, 2021

(65) Prior Publication Data

US 2022/0245666 A1 Aug. 4, 2022

(51) Int. Cl.
*G06Q 30/02* (2023.01)
*G06N 7/01* (2023.01)
*G06N 20/00* (2019.01)
*G06Q 30/0242* (2023.01)
*G06Q 30/06* (2023.01)
*G06Q 30/0601* (2023.01)

(52) U.S. Cl.
CPC ........... *G06Q 30/0243* (2013.01); *G06N 7/01* (2023.01); *G06N 20/00* (2019.01); *G06Q 30/0246* (2013.01); *G06Q 30/0633* (2013.01)

(58) Field of Classification Search
CPC .............. G06Q 30/02; G06Q 30/0202; G06Q 30/0243; G06Q 30/0247; G06N 20/20; G06F 16/2465; G06F 16/958
See application file for complete search history.

(56) References Cited

U.S. PATENT DOCUMENTS

| | | | |
|---|---|---|---|
| 7,987,182 B2 | 7/2011 | Slothouber et al. | |
| 9,183,562 B2* | 11/2015 | Chittilappilly | G06Q 30/02 |
| 11,538,047 B2* | 12/2022 | Mishra | G06Q 10/06312 |
| 2002/0112035 A1* | 8/2002 | Carey | G06F 16/958 |
| | | | 709/219 |
| 2008/0052163 A1* | 2/2008 | Koh | G06Q 10/10 |
| | | | 705/14.1 |
| 2009/0292599 A1 | 11/2009 | Rampell et al. | |

(Continued)

OTHER PUBLICATIONS

Kahneman, D., "Thinking, Fast and Slow," Farrar, Straus and Giroux, New York, 2011, 17 pgs. 2011.

*Primary Examiner* — Saba Dagnew
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform: tracking touchpoints by a user over a first time period; after receiving an order, determining, using a machine-learning model, a respective contribution of each of the touchpoints, wherein the machine-learning model is trained to predict a probability of the user placing the order during a second time period based on an input feature vector representing a set of touchpoints; and allocating a respective percentage of credit for the order to the each of the touchpoints based on the respective contributions of the each of the touchpoints. Other embodiments are disclosed.

20 Claims, 6 Drawing Sheets

(56) References Cited

U.S. PATENT DOCUMENTS

| | | | |
|---|---|---|---|
| 2013/0332264 A1* | 12/2013 | Chittilappilly | G06Q 30/02 |
| | | | 705/14.45 |
| 2016/0210657 A1* | 7/2016 | Chittilappilly | G06Q 30/0246 |
| 2017/0091810 A1* | 3/2017 | McGovern | G06Q 30/0247 |
| 2017/0270544 A1* | 9/2017 | Jaidka | G06Q 30/0202 |
| 2018/0300748 A1* | 10/2018 | Flaks | G06Q 30/0243 |
| 2019/0164084 A1* | 5/2019 | Gulin | G06F 16/9027 |
| 2019/0278378 A1 | 9/2019 | Yan et al. | |
| 2020/0151281 A1 | 5/2020 | Paulsen et al. | |
| 2021/0004386 A1* | 1/2021 | Andritsos | G06F 16/26 |
| 2021/0365279 A1* | 11/2021 | Chirakkil | G06F 11/302 |

* cited by examiner

PERCEIVED VALUE ATTRIBUTION MODEL

TECHNICAL FIELD

This disclosure relates generally relates perceived value attribution models.

BACKGROUND

Users can be inundated with multiple online and offline advertisements that can impact a decision to place an order for an item. Such decisions can be a based on short term or long term effects of different marketing channels viewed by the users.

BRIEF DESCRIPTION OF THE DRAWINGS

To facilitate further description of the embodiments, the following drawings are provided in which.

Figure 1:
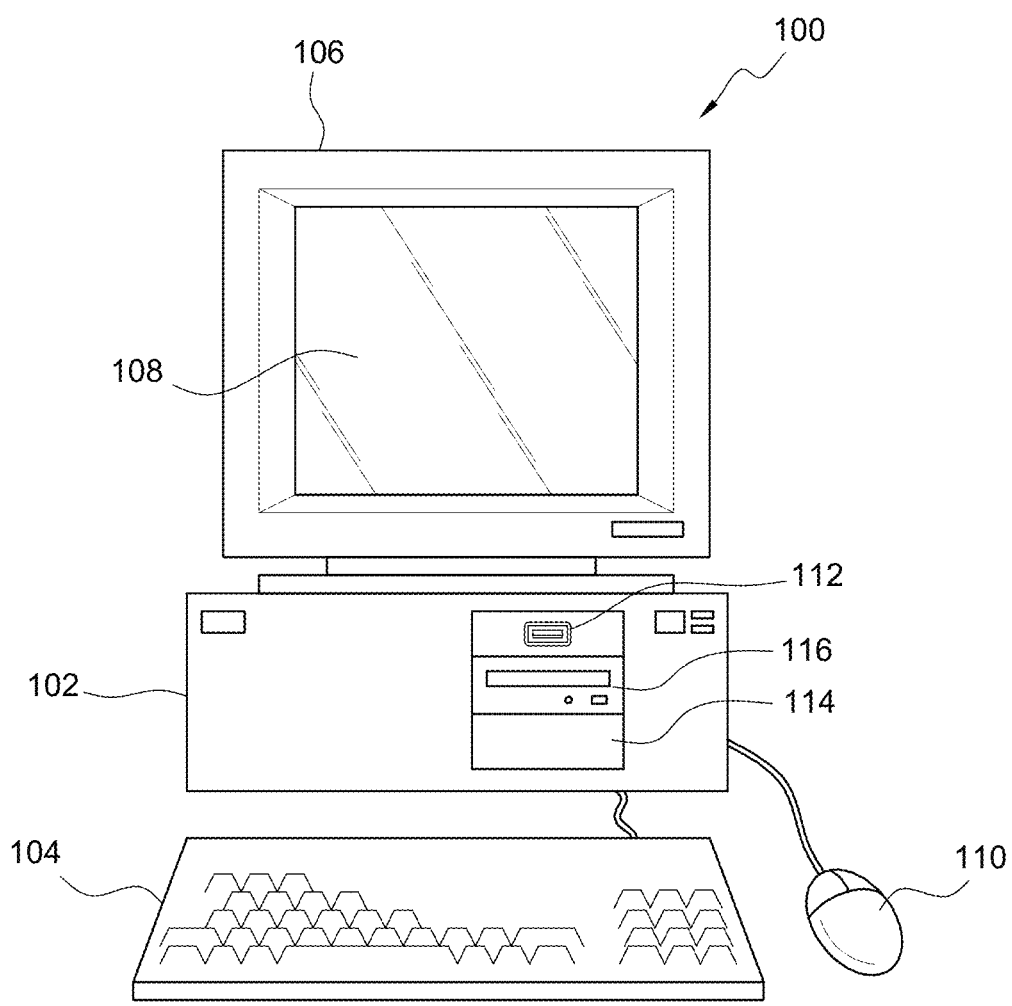
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 minute, 5 minutes, 10 minutes, or another suitable time delay period.

DESCRIPTION OF EXAMPLES OF EMBODIMENTS

Figure 2:
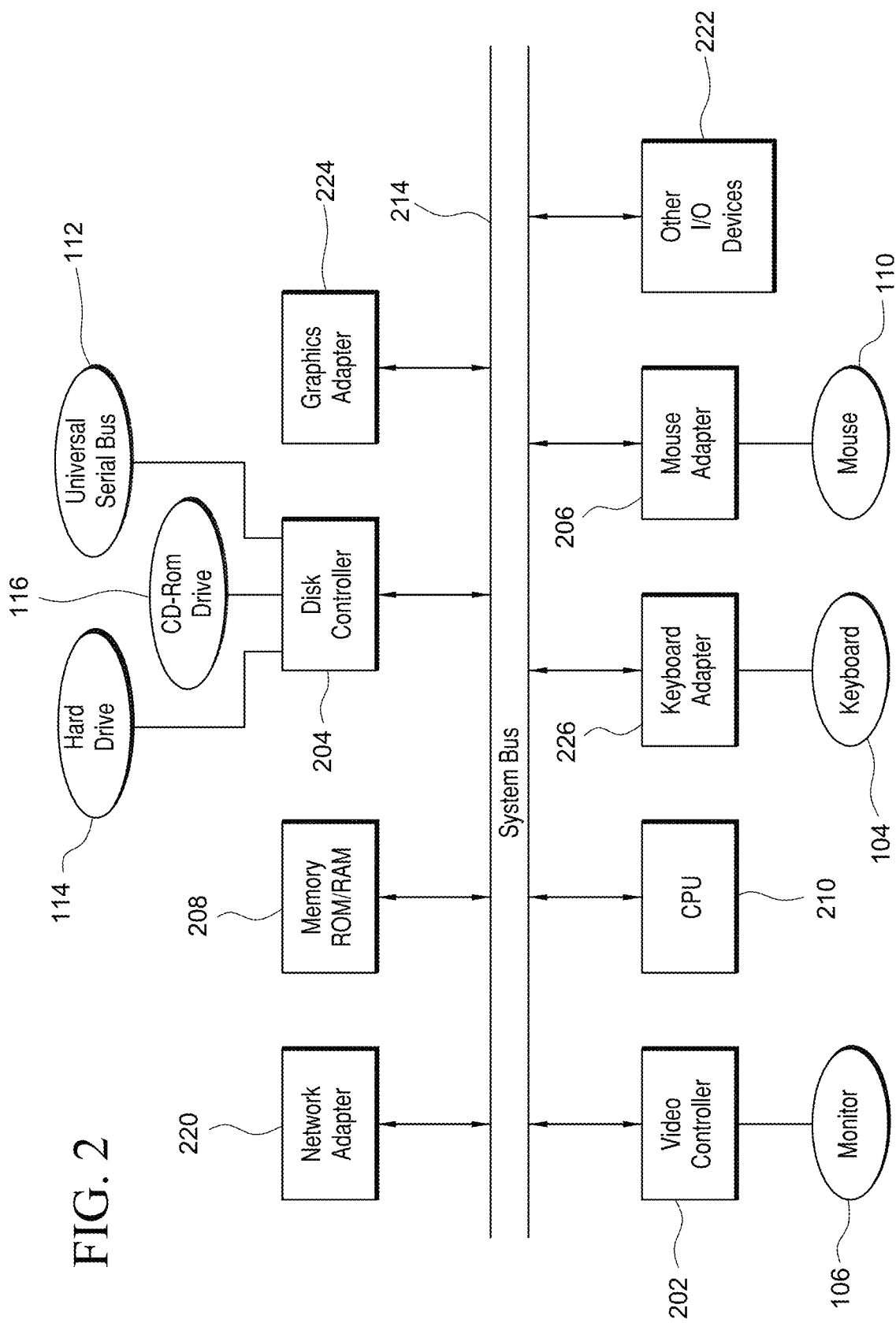
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
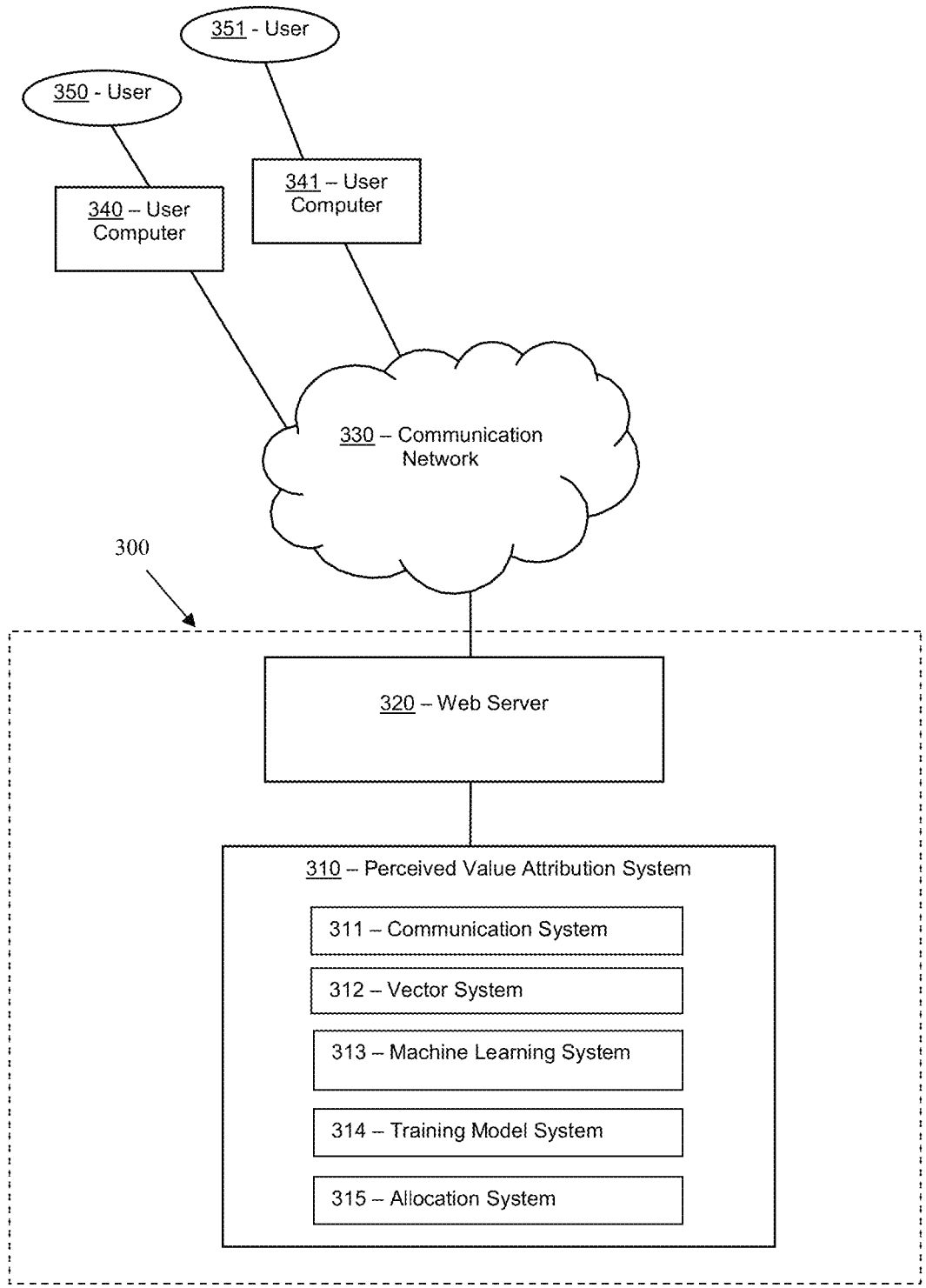
FIG. 3 illustrates a block diagram of a system that can be employed for an perceived value attribution system, according to an embodiment.

Turning ahead in the drawings, FIG. 3 illustrates a block diagram of a system 300 that can be employed for automatically allocating a respective percentage of credit for each touchpoint that resulted in an order of an item. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a perceived value attribution system and/or a web server 320. Perceived value attribution system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, perceived value attribution system 310 and/or web server 320. Additional details regarding perceived value attribution system 310 and/or web server 320 are described herein.

In a number of embodiments, each of perceived value attribution system 310 can be a special-purpose computer programed specifically to perform specific functions not associated with a general-purpose computer, as described in greater detail below.

In some embodiments, perceived value attribution system 310 can be in data communication through a communication network 330 with one or more user computers, such as user computers 340 and/or 341. Communication network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between perceived value attribution system 310 and/or web server 320 within system 300. Accordingly, in some embodiments, perceived value attribution system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

In some embodiments, communication network 330 can be an internal network that is not open to the public, which can be used for communications between perceived value attribution system 310 and/or web server 320. In other embodiments, communication network 330 can be a public network, such as the Internet. In several embodiments, operators and/or administrators of system 300 can manage system 300, the processor(s) of system 300, and/or the memory storage unit(s) of system 300 using the input device(s) and/or display device(s) of system 300, or portions thereof in each case.

In several embodiments, perceived value attribution system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to perceived value attribution system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of perceived value attribution system 310. In a similar manner, the processors and/or the non-transitory computer-readable media can be local and/or remote to each other.

Meanwhile, in many embodiments perceived value attribution system 310 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between perceived value attribution system 310, communication network 330, and/or the one or more databases can be implemented using any suitable manner of wired and/or wireless communication. Accordingly, perceived value attribution system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, perceived value attribution system 310 can include a communication system 311, a vector system 312, a machine learning system 313, a training model system 314 and/or an allocation system 315. In many embodiments, the systems of perceived value attribution system 310 can be modules of computing instructions (e.g., software modules) stored at non-transitory computer readable media that operate on one or more processors. In other embodiments, the systems of perceived value attribution system 310 can be implemented in hardware. Perceived value attribution system 310 can be a computer system, such as computer system 100 (FIG. 1), as described above, and can be a single computer, a single server, or a cluster or collection of computers or servers, or a cloud of computers or servers. In another embodiment, a single computer system can host perceived value attribution system 310. Additional details regarding perceived value attribution system 310 and the components thereof are described herein.

Figure 4:
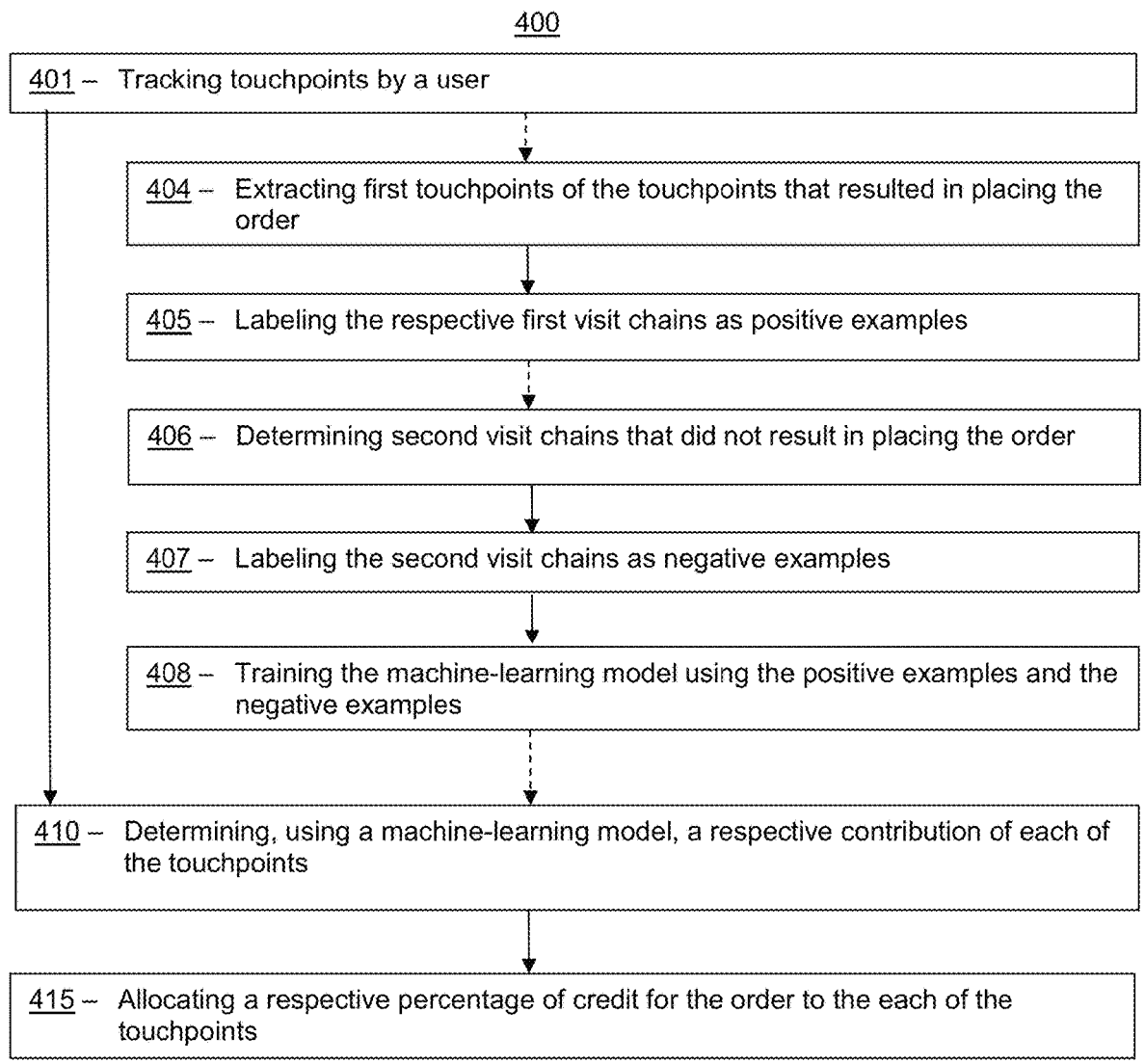
FIG. 4 illustrates a flow chart for a method, according to another embodiment.

Turning ahead in the drawings, FIG. 4 illustrates a flow chart for a method 400, according to another embodiment. In some embodiments, method 400 can be automatically allocating a percentage of credit for touchpoints that led to a purchase of an item or an order (e.g., online or in-person order). In many embodiments, allocating a percentage of credit can be implemented based on a machine learning model. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as perceived value attribution system 310 (FIG. 3) and/or web server 320 (FIG. 3). The processor(s) can be similar or identical to the processor(s) described above with respect to computer system 100 (FIG. 1).

Referring to FIG. 4, method 400 can include a block 401 of tracking touchpoints by a user over a first time period. In some embodiments, a touchpoint can refer to a user interaction with one or more marketing channels. For example, such marketing channels can include product listing advertisement and/or textual (keyword) advertisements associated with search engines, advertisements included on webpages, advertising emails, and/or another suitable interaction that led to an order of an item. These advertisements can be for the item ordered or for a different item, In some embodiments, each touchpoint on a touchpoint timeline (e.g., a user visit chain) can be related, associated with, or unrelated to, the item ordered. In various embodiments, each touchpoint can be one or more passive views (e.g., initiated by the user) by the user searching a category of items on a webpage. In some embodiments, the touchpoints can be associated with the same or a different marketing channels during a time period. The number of touchpoints that led to the order can be any number of touchpoints, such as 1, 3, 10, or even more, in some cases, and, in some embodiments, each of these touchpoints can be tracked by the system during a time period.

Figure 5:
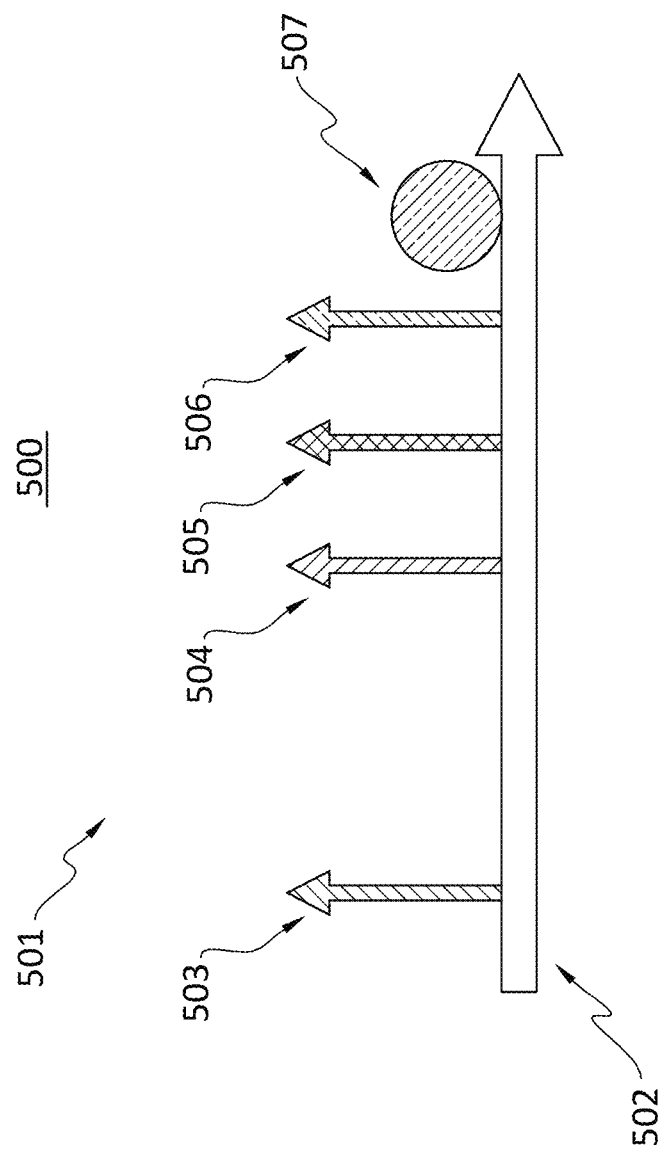
FIG. 5 illustrates a timeline of an exemplary user visit chain, according to an embodiment.

Jumping ahead in the drawings, FIG. 5 illustrates a timeline of an exemplary user visit chain 500, according to an embodiment. User visit chain 500 can include a touchpoint chain 501 that includes a number of touchpoint views and/or interactions by a user that resulted in an order (e.g., an online or in-person order) of an item over a time period 502. Touchpoint chain 501 can include a touchpoint 503, a touchpoint 504, a touchpoint 505, and a touchpoint 506, illustrating a sequential timeline of a series of views or interactions by a user with a sale, an advertisement, a webpage, an email, and/or any suitable sale campaign for an item that culminated in an order of an item. Each touchpoint (e.g., 503-506) along touchpoint chain 501 can represent an interaction with one or more marketing channels. For example, a user can engage with 4 touchpoints over a period of 10 days culminating with an order of a certain model of a television. The user can view an advertisement for a model of a specific brand of a television on day one, which can be tracked as a first touchpoint, then a day later, the user receives an email (e.g., as part of an email campaign) for general electronics including televisions and other electronic devices as a second touchpoint, then a few days later, the user searches a webpage for computers, which can be tracked as a third touchpoint, then another day later, the user receives a coupon for another model of television, which can be tracked as a fourth touchpoint, and then the user orders the specific brand of television viewed in the first touchpoint. In various embodiments, the contribution (e.g., a weight) of each marketing channel to the order of the item can be considered in attributing credit for the order to the touchpoints, such as allocating a percentage of credit for the order to the touchpoints, even when some touchpoints are subjectively related or unrelated to the item. In some embodiments, a number of touchpoints leading to placing an order can be 1 or more touchpoints over a given time period.

In many embodiments, the first time period can be approximately 1 month, 2 months, 3 months, 4 months, 6 months, or another suitable time period ending at the time of the order. In a number of embodiments, touchpoints that occurred before the first time period began do not receive any credit for the order.

Turning back in the drawings, in several embodiments, method 400 can include a block 404 of, for each historical order placed within a third time period, extracting first touchpoints of the touchpoints that are associated with a respective first visit chain that resulted in placing the historical order.

In some embodiments, method 400 further can include a block 405 of labeling the respective first visit chains as positive examples.

In various embodiments, the attribution algorithm used for a machine-learning model can include two parts model training and/or attribution calculation. In several embodiments, training the machine-learning model can include input of historical training examples constructed at user visit chain level. Such a user visit chain level can be similar or identical to user visit chain 501 (FIG. 5).

In a number of embodiments, each training example can include touchpoints along a visit chain that can be labeled with either a positive label or a negative label. In some embodiments, a label for each training example can refer to whether a user places an order or does not place an order at the end of the visit chain for a given time period.

In various embodiments, a training example with the user placing an order or purchasing an item can be labeled as a positive training example. In some embodiments, for each order placed in a time period of a month, all touchpoints up to 3 months before the order to can be extracted out as a set of raw features unrelated to a final user visit chain. For example, a user placed an order on Dec. 1, 2020, thus all of the marketing touchpoints viewed by the user between Sep. 1, 2020 and Dec. 1, 2020 can be extracted out from further analysis of the set of touchpoints that led to the order.

In various embodiments, before determining the respective contribution of the each of the touchpoints, method 400 additionally can include a block 406 of determining second visit chains that did not result in placing the order.

In several embodiments, before determining the respective contribution of the each of the touchpoints, method 400 also can include a block 407 of labeling the second visit chains as negative examples.

In several embodiments, a training example with the user does not place an order an item can be labeled as negative training example. In some embodiments, for each positive training example labeled, a predetermined number, h (e.g. h=3), of negative training examples can be labeled.

In many embodiments, constructing negative training examples can be performed as follows:

Activity 1.0: Find users (e.g., customers) who are similar to other users in a positive training example for an item.

Activity 2.0: Each user similarity can be measured by comparing similarities in historical user transactions and browsing histories by each of the users.

Activity 3.0: Randomly sample "h" visit chains from the visit chains of the similar other users, where the visit chains did not end or lead to an order of the item.

Activity 4.0: The labels for these training examples can be labeled as negative examples.

In various embodiments, before determining the respective contribution of the each of the touchpoints, method 400 further can include a block 408 of training the machine-learning model using the positive examples and the negative examples.

In several embodiments, the machine learning model can use 4 time periods and/or another suitable number of time periods in which to monitor user activities following a first touchpoint that can lead to an order or purchase. Such 4 time periods can include the following time periods:

Time period 1 can specify a time range of a time when the order is placed up to 3-days before the order is placed.

Time period 2 can specify another time range starting from the 3-day time period before the order is placed to a 7-day time period before the order is placed.

Time period 3 can specify another time range starting from the 7-day time period before the order is placed up to a 1-month time period before the order is placed.

Time period 4 can specify another time range starting from a 1-month time period before the order is placed up to a 3-month time period before the order is placed.

In several embodiments, user visit chains which do not result in placing an order can defined the time period relative to the model training date. For example, if the model were trained on Dec. 1, 2020, the label period can be defined as Nov. 1, 2020-Dec. 1, 2020 and the training period can be defined as Aug. 1, 2020 to Oct. 31, 2020. With Oct. 31, 2020 as the starting point, the 3-month training period can also be divided into 4 sub-periods similar to the case of the visit chain ending with an order.

In several embodiments, the machine-learning model can be trained using positive and negative training examples, such that:

$y_k^m$ denotes whether the customer places an order in category k (an additional dummy category can be introduced to represent the case of not placing an order);

$X_{tkc}^m$ denotes the feature vector, which is subscripted by time period, category, and marketing channel; and $X_{tkc}^m$ takes the value of 0 or 1, with 1 representing there is a touchpoint in period t, category k, and marketing channel c;

where:

superscript "m" denotes the $m^{th}$ training example, subscript "c" denotes the $c^{th}$ marketing channel, subscript "k" denotes the $k^{th}$ category in which the advertisement is included, subscript "t" denotes a pre-determined time period, such as the four time period described above.

In a number of embodiments, method 400 also can include a block 410 of, after receiving an order, determining, using a machine-learning model, a respective contribution of each of the touchpoints. In several embodiments, the machine-learning model can be trained to predict a probability of the user placing the order during a second time period based on an input feature vector representing a set of touchpoints. In some embodiments, the second time period can be approximately 15 days, 20 days, 25 days, 30 days, 45 days, 60 days, or another suitable time period.

In some embodiments, the machine-learning model can include a gradient boosting tree model. In several embodiments, the machine-learning model can be based on a decision tree algorithm to classify a touchpoint as having a positive label or a negative label. For example, such as gradient boosting tree model can use LightGBM, as described at https://lightgbm.readthedocs.io/en/latest/.

In various embodiments, training a data set for use in a machine-learning model can include training steps and periodic updates to the training data for the machine-learning model to learn from, in order to increase the accuracy of the predications. In some embodiments, one machine-learning model instance can be trained every day, every week and/or another suitable interval of time, using updated and/or new training data.

In several embodiments, the set of touchpoints can be categorized by the input feature vector using a set of time periods within the first time period, advertising categories, and marketing channels. In several embodiments, the machine learning model can use 4 time periods and/or another suitable number of time periods in which to monitor user activities following a first touchpoint that can lead to an order. Such 4 time periods can include the following time periods, which can be the same as described above during training. For example, in various embodiments, the set of time periods can include a fourth time period from an order time to approximately 3 days before the order. In many embodiments, the set of time periods also can include a fifth time period from approximately 3 days before the order to approximately 7 days before the order. In various embodiments, the set of time periods additionally can include a sixth time period from approximately 7 days before the order to approximately 1 month before the order. In some embodiments, the set of time periods further can include a seventh time period from approximately 1 month before the order to approximately 3 months before the order. In other embodiments, other time periods can be used.

In some examples, the training data for the machine-model can include instances (e.g., training examples) from which the machine-model can learn from and/or can generate a prediction. In several embodiments, once a machine-model instance (e.g., training example) is finished and iteratively updated, as part of training the data set, the machine-model can be used to predict the probability of the user placing an order in the next 30 days. For example, given a set of touchpoints, or equivalently a touchpoint vector {touchpoint_1, touchpoint_2, . . . , touchpoint_n}, feature vector $X_{tkc}$ can be constructed according to the procedure described above in a machine-model training step.

For example, assume that there are 2 time periods, 2 categories, and 2 marketing channels in the training data. A user (e.g., customer) first clicked an advertisement in category 1 from marketing channel 1 on time period 1, and then clicked another advertisement in category 2 from marketing channel 1 on time period 2. The feature vector $X_{tkc}$ will have 8 components, expressed as:

$$X_{tkc} = \{X_{111}, X_{112}, X_{121}, X_{122}, X_{211}, X_{212}, X_{221}, X_{222}\}.$$

Where a value of feature $X_{111}$ refers to 1, representing that there is a click for time period 1, category 1, and marketing channel 1. The value of feature $X_{221}$ also refers to 1, representing there is a click for time period 2, category 2, and marketing channel 1. All other features have values of 0.

In various embodiments, the machine-learning model, as trained, can be used to predict a probability of a user (e.g., customer) placing an order in the next 30 days given a touchpoint vector u, such that:

$$P\{\text{placing an order}|\text{touchpoints}\} = \Sigma_k \hat{y}_k,$$

where $\hat{y}_k$ refers to the predicted probability of placing an order in a category k given the feature vector $X_{tkc}$.

In various embodiments, method 400 can include a block 415 of allocating a respective percentage of credit for the order to the each of the touchpoints based on the respective contributions of the each of the touchpoints. In some embodiments, given an order, determining the percentage of credits to allocate toward each upstream touchpoints can be determined as follows:

Activity 1.0 Find all of the upstream touchpoints for the order within the last 3 months, denoted as touchpoint vector u.

Activity 2.0: Predict the probability of a user placing an order in the next 30 days given the touchpoint vector u.

Activity 3.0: Denote the contribution of touchpoint j as $v_j$ and denote the touchpoint vector excluding point j as u'.

Activity 4.0: Calculate $v_j$ as the probability of placing an order given touchpoint vector u subtracted by the probability of placing an order given touchpoint vector u', as follows:

$$v_j = P\{\text{placing an order}|u\} - P\{\text{placing an order}|u'\}$$

Activity 5.0: Allocate the credits assigned for each touchpoint $r_j$, as the normalized value of $v_j$, as follows:

$$r_j = \frac{v_j}{\sum_{j=1}^{n} v_j}$$

In some embodiments, block 415 of allocating the respective percentage of credits for the order to the each of the touchpoints can include normalizing the respective contributions of the each of the touchpoints.

Turning back in the drawings, FIG. 3 illustrates a block diagram of perceived value attribution system 310. Perceived value attribution system 310 is merely exemplary and is not limited to the embodiments presented herein. Perceived value attribution system 310 can be employed in many different embodiments or examples not specifically depicted or described herein. In some embodiments, certain elements or systems of perceived value attribution system 310 can perform various procedures, processes, and/or acts. In other embodiments, the procedures, processes, and/or acts can be performed by other suitable elements or systems. In many embodiments, the systems of perceived value attribution system 310 can be modules of computing instructions (e.g., software modules) stored at non-transitory computer readable media. In other embodiments, the systems of perceived value attribution system 310 can be implemented in hardware.

In many embodiments, perceived value attribution system 310 can include a communication system 311. In a number of embodiments, communication system 311 can at least partially perform block 401 (FIG. 4) of collecting historical data can include day-level aggregates of tasks performed tracking touchpoints by a user over a first time period.

In several embodiments, perceived value attribution 310 also can include a vector system 312. In various embodiments, vector system 312 can at least partially perform block 410 (FIG. 4) of, after receiving an order, determining, using a machine-learning model, a respective contribution of each of the touchpoints and/or block 404 (FIG. 4) of extracting first touchpoints of the touchpoints that are associated with a respective first visit chain that resulted in placing the historical order.

In many embodiments, perceived value attribution 310 further can include a machine learning system 313. In several embodiments, machine learning system 313 can at least partially perform block 410 (FIG. 4) of, after receiving an order, determining, using a machine-learning model, a respective contribution of each of the touchpoints.

In some embodiments, perceived value attribution 310 additionally can include a training model system 314. In many embodiments, training model system 314 can at least partially perform block 410 (FIG. 4) of, after receiving an order, determining, using a machine-learning model, a respective contribution of each of the touchpoints, block 404 (FIG. 4) of, for each historical order placed within a third time period, extracting first touchpoints of the touchpoints that are associated with a respective first visit chain that resulted in placing the historical order, block 405 (FIG. 4) of labeling the respective first visit chains as positive examples, block 406 (FIG. 4) of determining second visit chains that did not result in placing the order, block 407 (FIG. 4) of labeling the second visit chains as negative examples, and/or block 408 (FIG. 4) of training the machine-learning model using the positive examples and the negative examples.

In a number of embodiments, perceived value attribution 310 further can include an allocation system 315. In some embodiments, allocation system 315 can at least partially perform block 415 (FIG. 4) of allocating a respective percentage of credit for the order to the each of the touchpoints based on the respective contributions of the each of the touchpoints.

In several embodiments, web server 320 can at least partially perform sending instructions to user computers (e.g., 340-341 (FIG. 3)) based on information received from communication system 311.

Figure 6:
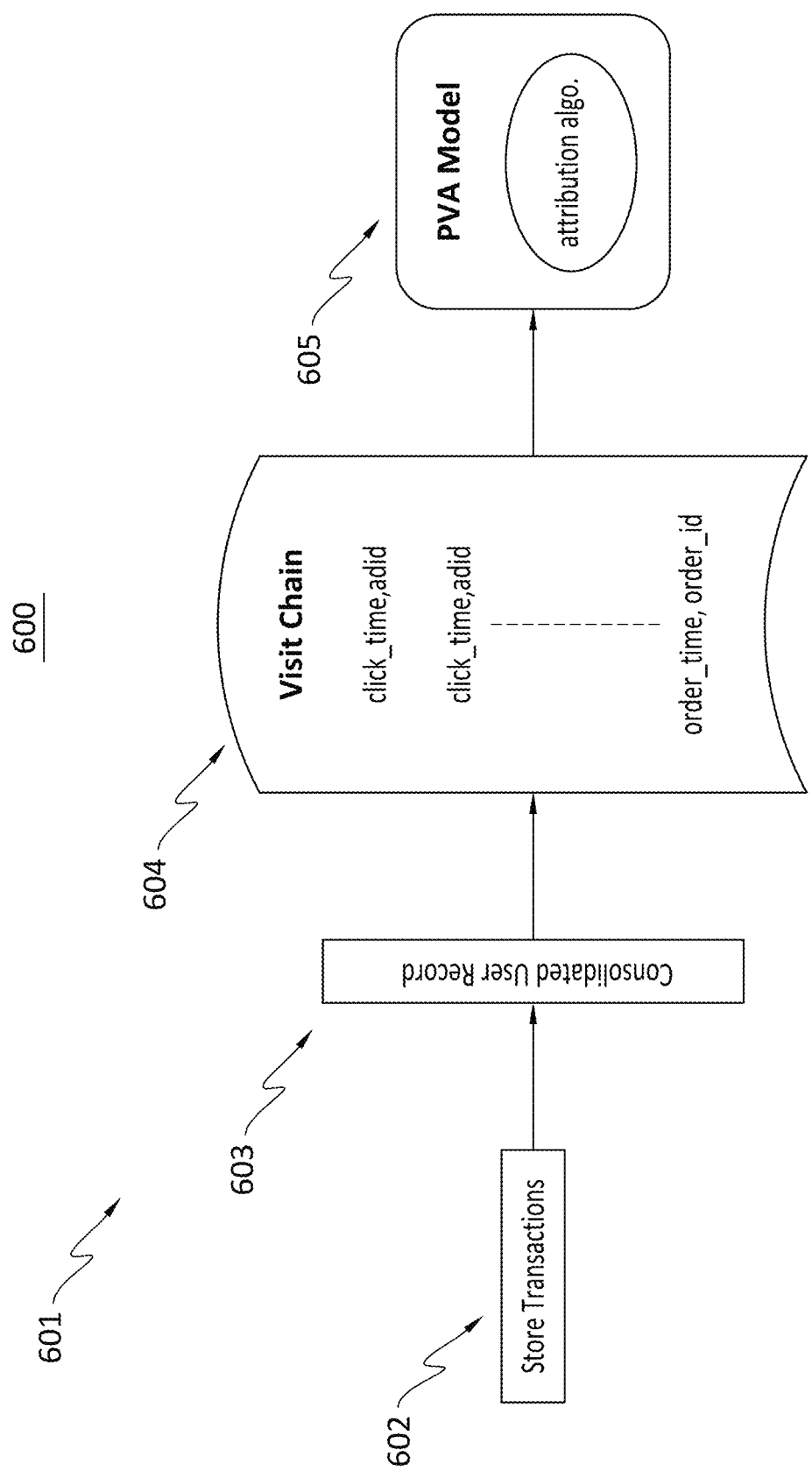
FIG. 6 illustrates a flow chart for a method, according to another embodiment.

Jumping ahead in the drawings, FIG. 6 illustrates a flow chart of a method 600, according to another embodiment. Method 600 can include an attribution flow 601 that can include receiving store transactions 602, consolidating user records 603, extracting visit chains 604, and applying an attribution algorithm 605. The user records received can be used to extract touchpoints of the visit chain, and can be obtained by multiple types of user behaviors, such as online transactions, tracked in-store transactions, online and offline marketing channels, databases, and/or another suitable source of tracked user behavior. Each touchpoint after the first touchpoint added to the visit chain 604 can include such data metrics as click data, advertisement identification (adid), time and date of placing an order, an order identification (order_id), and/or other suitable metrics along the visit chain. Given the set of touchpoints, attribution algorithm 605 can be used with a machine-learning model to predict a probability of the user placing an order within a time period using a touchpoint vector for the touchpoints. The machine-learning model can be similar or identical to machine-learning model described above in connection with block 410 (FIG. 4).

In some embodiments, a user order decision can be influenced using the perceived value attribution system by long-term effects of marketing advertisement (e.g., marketing channels) and by short-term effects of other marketing advertisements. During the attribution process, a single advertisement can be viewed by a user and can receive credits as impacting multiple orders. Short-term effects of an advertisement can be defined as the credits received from orders which are within 3 days of clicking this advertisement. Long-term effects can be defined as the credits received from more distant orders which are beyond 3 days of clicking the advertisement. As described earlier, the distinction between short-term and long-term effects is aligned with a user order decision process and can provide beneficial information to e-commerce for improving investment decision making. In several embodiments, an advantage of using perceived value attribution process can be shown by analyzing how short-term and long-term effects are calculated.

In many embodiments, the perceived value attribution model described herein can be an improvement over conventional last touch attribution (LTA) models by capturing the impacts of upper funnel touchpoints on user order decisions. The LTA marketing touchpoint method uses touchpoints from a 3-day window before the order. This LTA method is simple and easy to implement, but it ignores the potential impacts from other touchpoints. For example, user data obtained from the internet, webpage, webpage application, and orders can be consolidated to form a user visit chain. Unlike LTA, the perceived value attribution model considers all the marketing touchpoints over an extended period (e.g., 3 months) before the order. In several embodiments, an advantage of using the attribution algorithm module as part of the perceived value attribution model can be shown in determining a respective portion of credits (e.g., percentage of credit) assigned or allocated to each touchpoint based on features extracted from user visit chains.

In a number of embodiments, advantages of the perceived value attribution model can include improvements over the conventional methodology, such as leveraging the latest developments in behavior science providing deeper insight on how people make decisions and/or orders. In several embodiments, the perceived value attribution model can beneficially separate out the short-term and long-term perception value of marketing advertisements to align with order decision processes of users. In various embodiments, the perceived value attribution model can use data-driven approaches to derive the percentage of credits allocated to each marketing touchpoint. In some embodiments, another advantage of using the perceived value attribution model is the ability to generate the output in near real time for the internal pipeline, which can reduce the latency in attribution to seconds, minutes, and/or another suitable time period. With the increased awareness of data privacy and strictness of regulations, in many embodiments, collecting the same type of consumer web browsing behavior collected by third-party trackers can be challenging.

In many embodiments, generating attribution results can be used as direct input to reports showing the contribution of each marketing channel to a total gross merchandise value for an item. Such results also can provide a basis for optimizing budget allocation for both cross-channel and within-channel. In search engine marketing (SEM), attribution results can provide useful signals for determining the bids of SEM advertisements.

Conventionally, the field of attribution includes the process of studying the impact of upstream marketing touchpoints during a time period based on user orders. In some embodiments, upstream marketing touchpoints can include analysis of all of the touchpoints monitored within a certain time period that led to the order of the item. In several embodiments, upon gathering all of the touchpoints included in the time period, each touchpoint can be consequently assigned equal credits eliminating any differentiation for the weight each touchpoint added toward the. For example, a simple attribution model may split a gross merchandise value (GMV) of a customer order evenly among 4 upstream touchpoints, thus the attributed GMV assigned to each touchpoint is a quarter of the total. In several embodiments, an advantage of the perceived value attribution system 310 (FIG. 3) can include showing the value of each marketing channel and provide a basis for budget allocation and campaign optimization.

In a number of embodiments, the techniques described herein can advantageously provide a consistent user experience by dynamically determining a percentage of credit among the marketing channels viewed by a user to be allocated to each marketing channel after a user places an order. For example, over two million touchpoints can be received from third-party trackers and orders in one day. In some embodiments, the techniques provided herein can beneficially reduce computing resources and costs while continuing to offer real time updates on the impact of multiple marketing campaigns based on an amount of touchpoints received each second, minute, and/or other suitable time period in at least a day, a week, and/or another suitable time period. For example, a webpage can be viewed millions of times in a second with approximately one hundred million items and/or products available on the webpage at any given time period and as many marketing campaigns can be viewed from multiple marking channels.

In many embodiments, the techniques described herein can be used continuously at a scale that cannot be handled using manual techniques. For example, the number of daily and/or monthly visits to the internet and/or webpages can exceed approximately ten million and/or other suitable numbers, the number of registered users can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as determining whether to allocate a percentage of credit among the marketing channels (e.g., online marketing campaigns) viewed by a user that led to placing an order, does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because an online webpages, email campaigns, social media tracking user behavior, can power and/or feed an online website that is part of the techniques described herein would not exist.

Various embodiments can include a system including one or more processors and one or more non-transitory computer-readable media storing computing instructions configured to run on the one or more processors and perform certain acts. The acts can include tracking touchpoints by a user over a first time period. After receiving an order the acts also can include determining, using a machine-learning model, a respective contribution of each of the touchpoints. The machine-learning model can be trained to predict a probability of the user placing the order during a second time period based on an input feature vector representing a set of touchpoints. The acts additionally can include allocating a respective percentage of credit for the order to the each of the touchpoints based on the respective contributions of the each of the touchpoints.

A number of embodiments can include a method being implemented via execution of computing instructions configured to run at one or more processors and stored at one or more non-transitory computer-readable media. The method can include tracking touchpoints by a user over a first time period. After receiving an order, determining, using a machine-learning model, a respective contribution of each of the touchpoints. The machine-learning model can be trained to predict a probability of the user placing the order during a second time period based on an input feature vector representing a set of touchpoints. The method also can include allocating a respective percentage of credit for the order to the each of the touchpoints based on the respective contributions of the each of the touchpoints.

Although automatically determining a percentage of credit among the marketing channels viewed by a user to be allocated to each marketing channel after placing an order has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4 and 6 may include different procedures, processes, and/or activities and be performed by many different modules, in many different orders, and/or one or more of the procedures, processes, or activities of FIGS. 4 and 6 may include one or more of the procedures, processes, or activities of another different one of FIGS. 4 and 6. As another example, the systems within perceived value attribution system 310 and/or webserver 320 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
one or more processors; and
one or more non-transitory computer-readable media storing computing instructions that, when executed on the one or more processors, cause the one or more processor to perform operations comprising:
tracking touchpoints of a set of touchpoints by a user over a first time period, wherein each of the touchpoints comprises a respective interaction by the user with one or more marketing channels regarding an item where the respective interaction led to an order of the item or a different item, wherein the respective interaction by the user comprises at least a respective passive interaction with the one or more marketing channels, and wherein at least a portion of the set of touchpoints comprises respective touchpoints that led to the order of the item or that led to the order of the different item that is unrelated to the item;
before receiving the order, classifying, using a first machine-learning model comprising a decision tree algorithm, training examples of each of the touchpoints of the set of touchpoints tracked along respective visit chains over the first time period, wherein the first machine-learning model is trained to label respective training examples as either a positive example or a negative example to separate short-term from long-term perception values;
after receiving the order, determining, using a second machine-learning model comprising a gradient boosting tree model, a respective contribution of each of the touchpoints, wherein the second machine-learning model is trained to predict a probability of the user placing the order during a timeframe based on an input feature vector representing the set of touchpoints, wherein the input feature vector comprises a history of time points along on a sequential timeline of a series of interactions by the user, and wherein training data for the second machine-learning model is iteratively updated on a periodic basis;
determining a respective percentage of credits to allocate toward each of the touchpoints based on the respective contribution of each of the touchpoints and the input feature vector; and
allocating the respective percentage of credit for the order to each of the touchpoints that led to a transaction of the order.

2. The system of claim 1, wherein determining, using the second machine-learning model, the respective contribution of each of the touchpoints further comprises, for a respective touchpoint of the touchpoints:
determining, using the second machine-learning model, a first probability of placing the order during the timeframe when the set of touchpoints in the input feature vector that are input into the second machine-learning model include the respective touchpoint;
determining, using the second machine-learning model, a second probability of placing the order during the timeframe when the set of touchpoints in the input feature vector that are input into the second machine-learning model exclude the respective touchpoint; and
determining the respective contribution of the respective touchpoint based on the first probability and the second probability.

3. The system of claim 1, wherein the first time period is approximately 3 months.

4. The system of claim 1, wherein the timeframe is approximately 30 days.

5. The system of claim 1, wherein the set of touchpoints are categorized by the input feature vector using a set of time periods within the first time period, advertising categories, and the one or more marketing channels.

6. The system of claim 5, wherein the set of time periods comprises:
a fourth time period from an order time to approximately 3 days before the order;
a fifth time period from approximately 3 days before the order to approximately 7 days before the order;
a sixth time period from approximately 7 days before the order to approximately 1 month before the order; and
a seventh time period from approximately 1 month before the order to approximately 3 months before the order.

7. The system of claim 1, wherein the computing instructions, when executed on the one or more processors, further cause the one or more processors to perform operations comprising:

before determining the respective contribution of each of the touchpoints:
for each historical order of historical orders placed within a third time period, extracting first touchpoints of the touchpoints that are associated with a respective first visit chain of the respective visit chains that resulted in placing the historical order, wherein at least a portion of the first touchpoints are unrelated to the item or the different item; and
labeling the respective first visit chain for the historical orders as positive examples.

8. The system of claim 7, wherein the computing instructions, when executed on the one or more processors, further cause the one or more processors to perform operations comprising:
before determining the respective contribution of each of the touchpoints:
determining second visit chains of the respective visit chains that did not result in placing the order;
labeling the second visit chains of the respective visit chains as negative examples; and
training the first machine-learning model using the positive examples and the negative examples.

9. The system of claim 1, wherein the second machine-learning model further comprises an attribution algorithm.

10. The system of claim 1, wherein allocating the respective percentage of credit for the order to each of the touchpoints comprises normalizing the respective contribution of each of the touchpoints.

11. A method being implemented via execution of computing instructions configured to run on one or more processors and stored at one or more non-transitory computer-readable media, the method comprising:
tracking touchpoints of a set of touchpoints by a user over a first time period, wherein each of the touchpoints comprises a respective interaction by the user with one or more marketing channels regarding an item where the respective interaction led to an order of the item or a different item, wherein the respective interaction by the user comprises at least a respective passive interaction with the one or more marketing channels, and wherein at least a portion of the set of touchpoints comprises respective touchpoints that led to the order of the item or that led to the order of the different item that is unrelated to the item;
before receiving the order, classifying, using a first machine-learning model comprising a decision tree algorithm, training examples of each of the touchpoints of the set of touchpoints tracked along respective visit chains over the first time period, wherein the first machine-learning model is trained to label respective training examples as either a positive example or a negative example to separate short-term from long-term perception values;
after receiving the order, determining, using a second machine-learning model comprising a gradient boosting tree model, a respective contribution of each of the touchpoints, wherein the second machine-learning model is trained to predict a probability of the user placing the order during a timeframe based on an input feature vector representing the set of touchpoints, wherein the input feature vector comprises a history of time points along on a sequential timeline of a series of interactions by the user, and wherein training data for the second machine-learning model is iteratively updated on a periodic basis;
determining a respective percentage of credits to allocate toward each of the touchpoints based on the respective contribution of each of the touchpoints and the input feature vector; and
allocating the respective percentage of credit for the order to each of the touchpoints that led to a transaction of the order.

12. The method of claim 11, wherein determining, using the second machine-learning model, the respective contribution of each of the touchpoints further comprises, for a respective touchpoint of the touchpoints:
determining, using the second machine-learning model, a first probability of placing the order during the timeframe when the set of touchpoints in the input feature vector that are input into the second machine-learning model include the respective touchpoint;
determining, using the second machine-learning model, a second probability of placing the order during the timeframe when the set of touchpoints in the input feature vector that are input into the second machine-learning model exclude the respective touchpoint; and
determining the respective contribution of the respective touchpoint based on the first probability and the second probability.

13. The method of claim 11, wherein the first time period is approximately 3 months.

14. The method of claim 11, wherein the timeframe is approximately 30 days.

15. The method of claim 11, wherein the set of touchpoints are categorized by the input feature vector using a set of time periods within the first time period, advertising categories, and the one or more marketing channels.

16. The method of claim 15, wherein the set of time periods comprises:
a fourth time period from an order time to approximately 3 days before the order;
a fifth time period from approximately 3 days before the order to approximately 7 days before the order;
a sixth time period from approximately 7 days before the order to approximately 1 month before the order; and
a seventh time period from approximately 1 month before the order to approximately 3 months before the order.

17. The method of claim 11, further comprising, before determining the respective contribution of each of the touchpoints:
for each historical order of historical orders placed within a third time period, extracting first touchpoints of the touchpoints that are associated with a respective first visit chain of the respective visit chains that resulted in placing the historical order, wherein at least a portion of the first touchpoints are unrelated to the item or the different item; and
labeling the respective first visit chain for the historical orders as positive examples.

18. The method of claim 17, further comprising, before determining the respective contribution of each of the touchpoints:
determining second visit chains of the respective visit chains that did not result in placing the order;
labeling the second visit chains of the respective visit chains as negative examples;
training the first machine-learning model using the positive examples and the negative examples.

19. The method of claim 11, wherein the second machine-learning model comprises an attribution algorithm.

20. The method of claim 11, wherein allocating the respective percentage of credit for the order to each of the touchpoints comprises normalizing the respective contribution of each of the touchpoints.

\* \* \* \* \*